US012789626B2

(12) United States Patent
Hejda et al.

(10) Patent No.: US 12,789,626 B2
(45) Date of Patent: Nov. 10, 2026

(54) REFLECTION DISPLAY SYSTEM AND METHOD FOR OPERATING A REFLECTION DISPLAY SYSTEM WITH MASKING DETECTION

(71) Applicant: Bayerische Motoren Werke Aktiengesellschaft, Munich (DE)

(72) Inventors: Tomas Hejda, Neufahrn (DE); Sadzida Kratz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 159 days.

(21) Appl. No.: 18/683,817

(22) PCT Filed: Jun. 23, 2022

(86) PCT No.: PCT/EP2022/067246
§ 371 (c)(1),
(2) Date: Feb. 15, 2024

(87) PCT Pub. No.: WO2023/041211
PCT Pub. Date: Mar. 23, 2023

(65) Prior Publication Data

US 2024/0351437 A1 Oct. 24, 2024

(30) Foreign Application Priority Data

Sep. 15, 2021 (DE) ..................... 10 2021 123 814.5

(51) Int. Cl.
*B60K 35/234* (2024.01)
*B60K 35/20* (2024.01)
(Continued)

(52) U.S. Cl.
CPC ............ *B60K 35/235* (2024.01); *B60K 35/20* (2024.01); *B60K 35/22* (2024.01); *B60K 35/23* (2024.01);
(Continued)

(58) Field of Classification Search
CPC ........ B60K 35/20; B60K 35/22; B60K 35/23; B60K 35/234; B60K 35/235;
(Continued)

(56) References Cited

U.S. PATENT DOCUMENTS 9,245,333 B1 1/2016 Beck et al.
2014/0034806 A1 * 2/2014 Vincen ................ H04N 9/3194 250/221
(Continued)

FOREIGN PATENT DOCUMENTS

CN 110073273 7/2019
DE 10 2012 204 303 A1 9/2013
(Continued)

OTHER PUBLICATIONS

International Search Report (PCT/ISA/210) issued in PCT Application No. PCT/EP2022/067246 dated Oct. 11, 2022 with English translation (5 pages).
(Continued)

*Primary Examiner* — Charles J Han
(74) *Attorney, Agent, or Firm* — Crowell & Moring LLP

(57) ABSTRACT

A method for operating a reflection display system for displaying a display image for a vehicle occupant of a motor vehicle by reflection of the display image on a reflection surface, in particular on a front windscreen, includes outputting a sequence of measurement display images with different patterns with different lighting intensities in some regions; detecting a brightness signal by an ambient brightness sensor while each measurement display image of the sequence is being displayed in order to obtain a brightness profile of the brightness signals; evaluating the profile of the brightness signals with respect to a predefined reference brightness profile which specifies brightness signals when the display surface is uncovered, for the sequence of mea-
(Continued)

surement display images with constant ambient brightness; and signaling the presence of a foreign object on the display surface depending on the result of the evaluation.

15 Claims, 3 Drawing Sheets

(51) Int. Cl.
*B60K 35/22* (2024.01)
*B60K 35/23* (2024.01)
*B60K 35/235* (2024.01)
*G02B 27/01* (2006.01)

(52) U.S. Cl.
CPC ........ *B60K 35/234* (2024.01); *G02B 27/0101* (2013.01)

(58) Field of Classification Search
CPC ........ G02B 2027/012; G02B 2027/014; G02B 2027/0141
See application file for complete search history.

(56) References Cited

U.S. PATENT DOCUMENTS

| | | | | |
|---|---|---|---|---|
| 2015/0042541 | A1* | 2/2015 | Hashimoto .......... | H04N 9/3182 345/7 |
| 2015/0309206 | A1 | 10/2015 | Kuntze et al. | |
| 2019/0204592 | A1 | 7/2019 | Fujita | |
| 2019/0271842 | A1 | 9/2019 | Fujita | |
| 2019/0271905 | A1 | 9/2019 | Fujita | |

FOREIGN PATENT DOCUMENTS

| | | | | |
|---|---|---|---|---|
| DE | 10 2012 021 972 | A1 | | 5/2014 |
| DE | 10 2019 116 084 | A1 | | 12/2020 |
| EP | 2 693 256 | A1 | | 2/2014 |
| FR | 3 064 081 | A1 | | 9/2018 |
| JP | 2010-243940 | A | | 10/2010 |
| JP | 2019002959 | A | * | 1/2019 |
| KR | 1998-014603 | A | | 5/1998 |

OTHER PUBLICATIONS

German-language Written Opinion (PCT/ISA/237) issued in PCT Application No. PCT/EP2022/067246 dated Oct. 11, 2022 with English translation (12 pages).
German-language Search Report issued in German Application No. 10 2021 123 814.5 dated May 11, 2022 with partial English translation (10 pages).
Chinese-language Office Action issued in Chinese Application No. 202280041865.5 dated Mar. 23, 2026 with English translation (15 pages).
Chinese-language Office Action issued in Chinese Application No. 202280041865.5 dated Aug. 20, 2026, with English translation (20 pages).

* cited by examiner

REFLECTION DISPLAY SYSTEM AND METHOD FOR OPERATING A REFLECTION DISPLAY SYSTEM WITH MASKING DETECTION

BACKGROUND AND SUMMARY

The invention relates to front windshield display systems, in particular reflection display systems, such as for example PHUDs, for motor vehicles. The present invention relates in particular to measures for detecting an object in the optical beam path of the front windshield display system.

Reflection display systems, such as for example PHUDs, comprise a display unit which is arranged on the upper side of the dashboard and the display of which is reflected on the inner side of the front windshield and can be perceived by an occupant of the vehicle. The display unit is in this case arranged somewhat depressed on the upper side of the dashboard, so that a direct view of the display surface of the display unit is prevented, in order in this way to avoid the user being dazzled by the glare of light shining directly into the eye.

However, due to the arrangement of the display unit in such a depression on the upper side of the dashboard, foreign objects resting on the display unit are also not readily visible from the normal eye position of the vehicle occupants. However, these foreign objects lie in the beam path of the display image and can thus mask parts of the display, so that possibly legally relevant display symbols, such as for example speed indications, chamber lights, remaining range and the like, are not visible, but the absence of these display symbols is also not noticed since they are not permanently displayed.

Use of a cover glass, as is used for example in classic head-up displays, is disadvantageous in such reflection display devices, since it can cause new reflections of ambient light onto the windshield, which significantly impair the perceptibility of the reflection image when there is high ambient brightness.

Approaches so far merely envisage detecting foreign objects resting on the display unit by way of additional devices, such as for example cameras or light barriers or the like.

The object of the present invention is to provide an improved method for detecting maskings of a display image in a reflection display system.

This object is achieved by a method for operating a reflection display system, a reflection display system, and a motor vehicle according to the claimed invention.

According to a first aspect, a method for operating a reflection display system for displaying a display image for a vehicle occupant of a motor vehicle by reflection of the display image on a reflection surface, in particular on a front windshield, is provided, wherein a display unit is designed to output the display image via a display surface of the display unit, the display unit being arranged on an upper side of a dashboard such that a reflection of the display image via the front windshield is perceptible in an eye region of a vehicle occupant; comprising the following steps:

- outputting a sequence of measurement display images with different patterns with different lighting intensities from region to region;
- detecting a brightness signal by an ambient brightness sensor while the respective measurement display image of the sequence is being displayed in order to obtain a brightness profile of the brightness signals;
- evaluating the brightness profile of the brightness signals with respect to a predefined reference brightness profile which specifies brightness signals when the display surface is unmasked for the sequence of measurement display images when there is constant ambient brightness;
- depending on the result of the evaluation, signaling the presence of a foreign object on the display surface.

A reflection display system, such as for example a PHUD (panoramic head-up display) comprises a display unit arranged on the upper side of the dashboard. The display unit is designed to output a bright display image, which is reflected on the inner side of the front windshield in a reflection region. The reflected display image can be perceived by a a vehicle occupant.

Foreign objects placed on the dashboard may entirely or partially mask components for displaying information via the front windshield. If the reflection display system is used for displaying safety-relevant information, it may however be necessary to distinguish between when information is not displayed and when the display of information is blocked by a foreign object resting on the display surface.

Foreign objects in the context of embodiments of this invention may be any objects that hinder the perception of a display image, such as for example pieces of clothing, papers and the like.

The display unit may be arranged somewhat depressed on the upper side of the dashboard, so that a direct view of the display surface of the display unit is prevented, in order in this way to avoid the user being dazzled by the glare of light shining directly into the eye. In particular if the display unit is arranged in such a depression on the upper side of the dashboard, however, foreign objects resting on the display unit are not readily visible from the normal eye position of the vehicle occupant. However, these foreign objects lie in the beam path of the display image and can thus mask parts of the display, so that possible safety-relevant and legally prescribed display symbols, such as for example speed indications, chamber lights, remaining range and the like, are not visible. However, the absence of these display symbols cannot be readily noticed, since they are not permanently displayed.

With the aid of the above reflection display system, it is possible to detect whether the display unit is free of resting foreign objects on the display surface. It can in this way be detected whether the beam path of the reflection display system is disturbed by a foreign object on the display surface. Detection of such an interruption in the display of the reflection display system is essential in order to be able to signal a warning or other countermeasures. The above reflection display system consequently makes possible automated detection of a foreign object disturbing the display image on the display surface of the display unit.

The reflection display system is provided with an ambient brightness sensor. This can be used to adapt the display brightness to the ambient brightness, so that the displayed display image is always displayed with sufficient brightness.

Such an ambient brightness sensor is generally arranged in the depression or near the display unit, since the reflection display system and the ambient brightness sensor generally form a structural unit. Moreover, on the basis of its primary function, the ambient brightness sensor should detect the ambient brightness near the reflected display image.

Due to the proximity of the ambient brightness sensor to the display unit, light emitted by the display unit influences the brightness or light intensity sensed by the ambient brightness sensor. To detect a foreign object on the display surface of the display unit, the above method thus envisages outputting a time sequence comprising a number of different measurement display images. With the aid of the ambient brightness sensor, during the display of each measurement display image a corresponding brightness signal is recorded, reflecting the brightnesses of the measurement display images of the sequence by the ambient brightness sensor being influenced by the display image.

The measurement display images may in each case have a pattern which has a region of high luminous intensity in front of a remaining region of low luminous intensity.

In particular, the regions of high luminous intensity of all the measurement display images may cover the entire display region.

It may be provided that at least one pattern of the measurement display images comprises:

- one or more strip-like regions of high luminous intensity with otherwise a darkly displayed background;
- checkerboard regions of high luminous intensity with otherwise a darkly displayed background; or
- regions of different luminous intensity, in particular with otherwise a darkly displayed background.

Consequently, the measurement display images may be designed to output a pattern which outputs a high luminous intensity, preferably white image points, in one or more regions and outputs a low luminous intensity, preferably black image points, in the remaining regions. When there is an unmasked display surface, such a sequence of measurement display images produces a specific profile of the brightness signal, which can be measured irrespective of the ambient brightness. The ambient brightness overlies this brightness profile as a constant brightness offset, in particular if the sequence of measurement images is run through in a sufficiently short time.

The evaluation may on the one hand be performed by the brightness profile being compared directly with the reference brightness profile. If it is detected that the brightness profile deviates from the reference brightness profile by more than a predetermined amount, masking of the display surface is signaled. This procedure requires the reference brightness profile to make allowance for the ambient brightness.

On the other hand, the evaluation of the profile of the brightness signals may be carried out with respect to a predefined reference brightness profile, by the brightness signals sensed by the ambient brightness sensor being evaluated differentially, by the differences respectively arising between two measurement display images when there is a known sequence of measurement display images being compared with a corresponding predefined difference of the brightnesses according to the reference brightness profile, and the presence of the foreign object being detected if the comparison shows that there is a deviation.

In particular, for the evaluation of the brightness signal sensed by the ambient brightness sensor, the sensed brightness may consequently be evaluated such that, when there is a known sequence of measurement display images, a predefined change in the sensed brightnesses according to the reference brightness profile must be obtained from measurement display image to measurement display image if there is no foreign object on the display surface. If the corresponding difference of the brightnesses respectively between two measurement display images is not detected, masking of the display surface can be inferred.

It may be provided that the method is only performed if an enabling condition is satisfied, an enabling condition being satisfied:

- if an ambient brightness lies not above a predefined threshold value, and/or
- if a gradient of a variation of the ambient brightness lies below a predetermined threshold value.

In particular, the sequence of measurement display images may be run through within a time period of less than 1 s, in particular in less than 100 ms. The aim is to implement the method as unobtrusively as possible.

Another possibility is to provide the sequence of measurement display images within a predefined video sequence, the brightness profile being recorded at the corresponding output times of the measurement display images when outputting the video sequence. If the video sequence is output, the brightness signals can be displayed at points in time of the display of the measurement display images within the video sequence. This makes possible a determination of the brightness profile for longer time periods too.

According to a further aspect, a reflection display system for displaying a display image for a vehicle occupant of a motor vehicle by reflection of the display image on a reflection surface, in particular on a front windshield, is provided, comprising:

- a display unit, which is designed to output the display image via a display surface of the display unit, the display unit being arranged on an upper side of a dashboard such that a reflection of the display image via the front windshield is perceptible in an eye region of a vehicle occupant;
- an ambient brightness sensor, which is designed to detect an ambient brightness and to provide a corresponding brightness signal;
- a control unit, which is designed to:
  - output a sequence of measurement display images with different patterns with different luminous intensities from region to region;
  - detect the brightness signal by the ambient brightness sensor while the respective measurement display image of the sequence is being displayed in order to obtain a brightness profile of the brightness signals;
  - evaluate the profile of the brightness signals with respect to a predefined reference brightness profile which specifies brightness signals when the display surface is unmasked for the sequence of measurement display images when there is constant ambient brightness;
  - depending on the result of the evaluation, signal the presence of a foreign object on the display surface.

According to one embodiment, the ambient brightness sensor may be arranged such that an output of a region of high luminous intensity by the display unit influences a measurement of the brightness signal.

Furthermore, the display unit may be arranged in a depression such that the display image that is displayed on the display surface of the display unit is not directly perceptible in the eye region, in particular the ambient brightness sensor being arranged in the depression, in particular to the side of the display unit.

According to a further aspect, a motor vehicle is provided, comprising:

- a dashboard between a front windshield of the motor vehicle and a steering column;
- the above reflection display system.

Embodiments are explained in more detail below on the basis of the appended drawings.

DETAILED DESCRIPTION OF THE DRAWINGS

Figure 1:
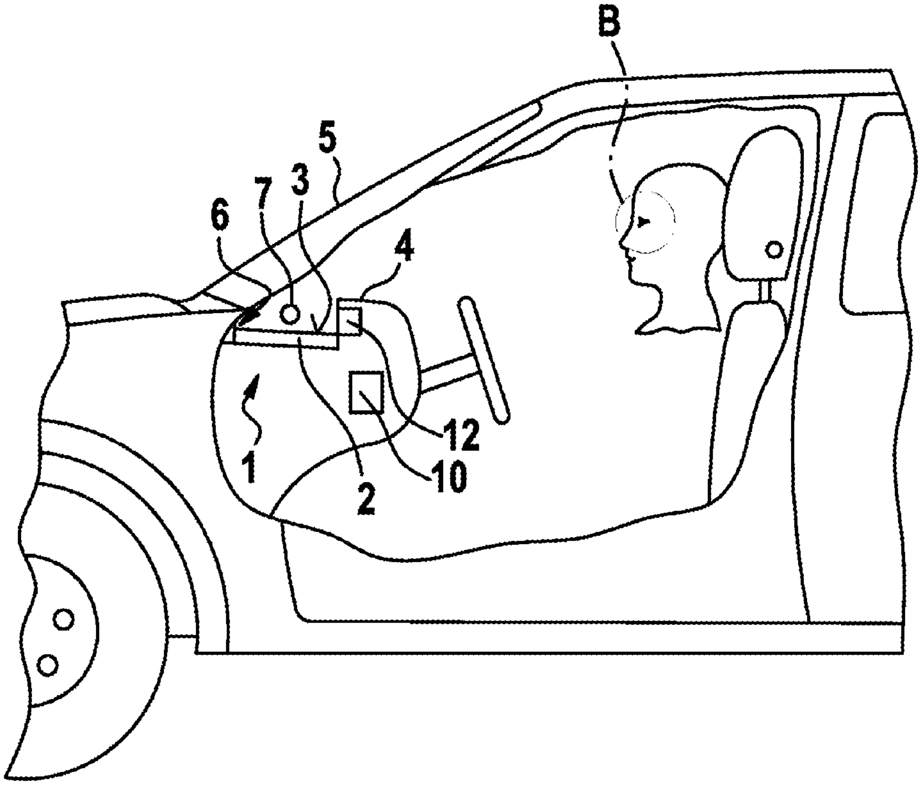
FIG. 1 shows a schematic cross-sectional representation of a reflection display system in a motor vehicle.

FIG. 1 shows a schematic cross-sectional representation through a motor vehicle with a reflection display system 1. The reflection display system is arranged on an upper side of a dashboard 4 and has a display unit 2, which comprises a display surface 3 for displaying a display image. The display unit 2 is arranged on the upper side of the dashboard 4 under a front windshield 5.

The display surface 3 is aligned with respect to the front windshield 5 such that a display image displayed on the display surface of the display unit 2 is reflected on a lower region of the inner side of the front windshield 5 and can be perceived by a vehicle occupant in an eye region B. This allows the alignment of the display unit 2 or its display surface to be preferably substantially parallel to the longitudinal and transverse axes of the vehicle or to deviate from them by an angle of no more than 0-20°.

The display unit 2 may be fitted in a depression 6 of the dashboard, so that a direct view of the display surface 3 of the display unit 2 by the vehicle occupant is not possible and dazzling of the vehicle occupants by the glare of direct light from the display surface 3 into the eye region B is avoided. Furthermore, the display surface 3 of the display unit 2 is aligned such that a displayed display image is reflected on the inner side of the front windshield 5 and can be perceived by a vehicle occupant in an eye region B as a reflection image on the front windshield 5.

The display unit 2 is preferably designed as a micro-LED display unit in order to provide a bright display image, so that the reflection produced can be perceived via the corresponding region of the front windshield 5 even when there is high ambient brightness.

Since the display unit 2 is arranged in the depression 6 on the upper side of the dashboard 4, a foreign object 7 can also get into this depression 6 and consequently come to lie on the display surface 3 of the display unit 2. A display image displayed on the display unit 2 can then not be perceived, or only partially, by a vehicle occupant as a reflection image.

The display unit 2 is designed as a micro-LED display unit in order to provide a bright display image, so that the reflection produced can be perceived via the corresponding region of the front windshield 5 even when there is high ambient brightness.

An ambient brightness sensor 12 which is designed for measuring the ambient brightness may be arranged in the depression 6. With the aid of a control unit 10, the operation of the reflection display system is controlled. In particular, the control unit 10 can measure the ambient brightness with the aid of the ambient brightness sensor 12 and set the display image emitted by the display unit 2 with regard to the luminous intensity. The aim here is to set the luminous intensity of the display image such that the display image can be perceived by a user even when there is high ambient brightness.

Figure 2:
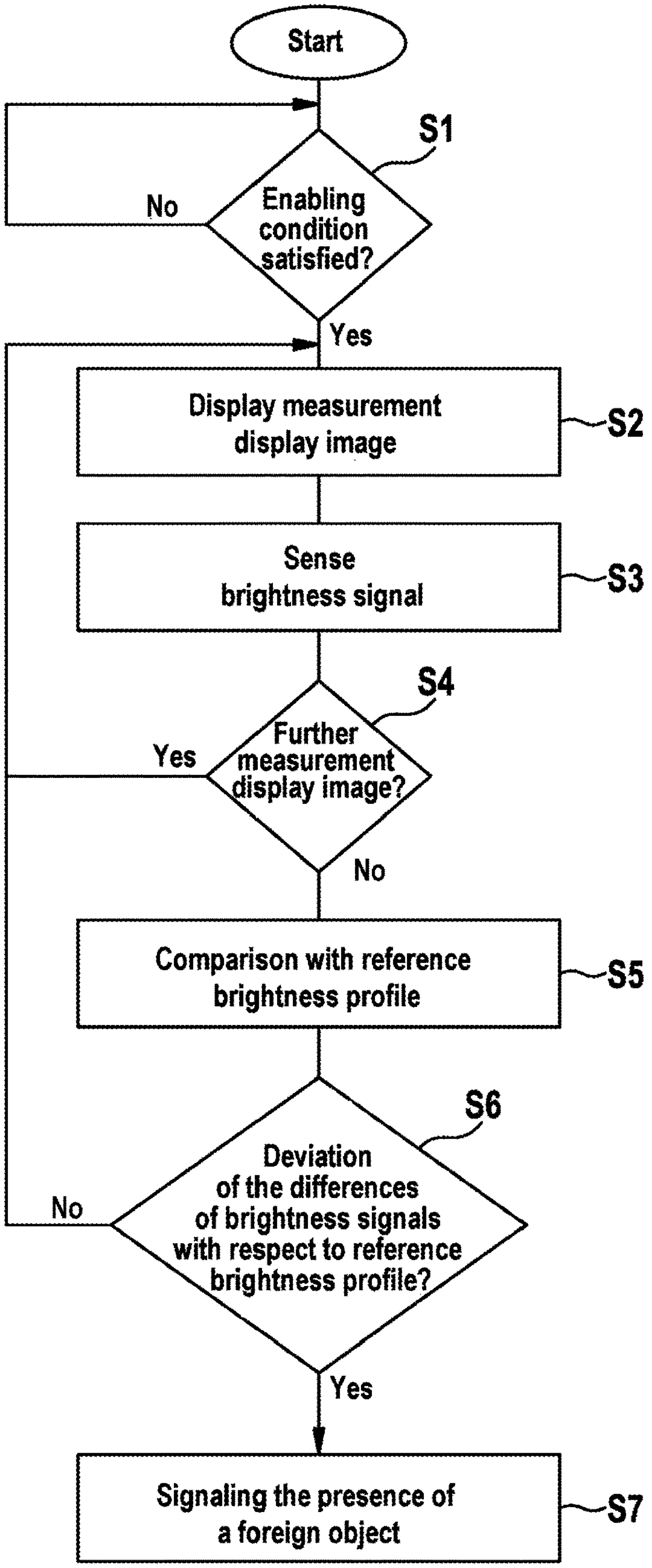
FIG. 2 shows a flow diagram to represent a sequence of a method for detecting and signaling a foreign object on the display surface.
Figure 3A:
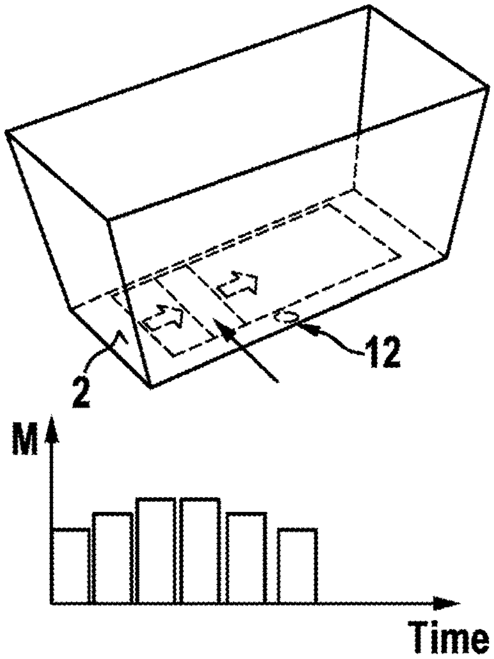
FIGS. 3*a* and 3*b* show a schematic representation of a sequence of displayed measurement display images along with a correspondingly sensed brightness signal for the case where a masking foreign object is not present and the case where there is a foreign object masking the display.
Figure 3B:
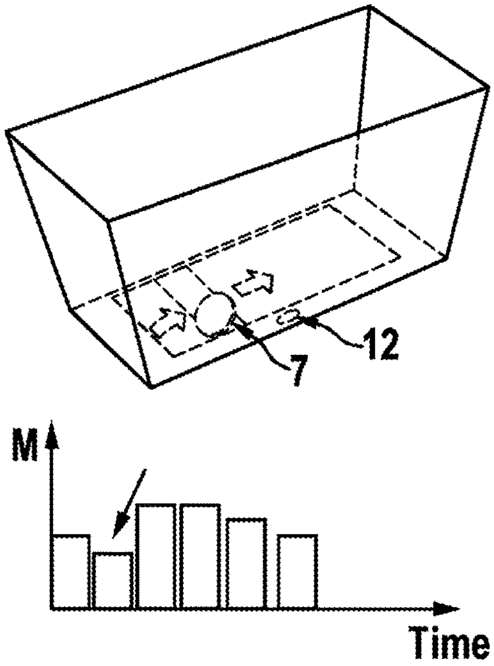

To detect whether or not a foreign object 7 is resting on the display surface 3, the control unit 10 may also be designed to perform a method such as is described in conjunction with FIGS. 2, 3*a* and 3*b*.

FIG. 2 shows on the basis of the flow diagram the sequence of the method for detecting and signaling a foreign object 7 on the display surface 3, FIGS. 3*a* and 3*b* schematically show a sequence of displayed measurement display images along with a correspondingly sensed brightness signal for the case where no foreign object 7 is resting on the display surface 3 of the display unit 2 and the case where a foreign object 7 is partially masking the display surface 3.

In step S1, it is first checked whether an enabling condition for performing masking detection is satisfied. The enabling condition checks whether the ambient brightness condition(s) is/are suitable for performing a measurement of masking of the display surface 3 by a foreign object 7.

An enabling condition may concern a measure of the ambient brightness. For this purpose, the ambient brightness may be measured, preferably with the display unit 2 deactivated for a short time. If the ambient brightness lies not above a predefined threshold value, it can be established that the enabling condition is not satisfied, since differences of the brightness signal when there is high ambient brightness can only be evaluated inaccurately or cannot be evaluated.

A further enabling condition, in which it is checked whether the ambient brightness fluctuates greatly, i.e. a variation of the ambient brightness has a gradient that exceeds a predefined threshold value, may alternatively or additionally also be checked. The enabling condition is satisfied if the gradient lies below a predefined threshold value.

If the enabling condition is satisfied (alternative: yes), the method is continued with step S2, otherwise a return is made to step S1.

In step S2, a first or a further measurement display image is displayed on the display unit 2. The measurement display image may provide a pattern in which a region of high luminous intensity is output, in particular with white pixels of high intensity, and the remaining regions are output with low luminous intensity, in particular with black pixels of low or not high luminous intensity. For example, the measurement display image may output as a region of high luminous intensity a strip on the otherwise darkly displayed region, as shown for example in FIG. 3*a*.

The output measurement display image leads to a brightness signal of the ambient brightness sensor 12, which in step S3 is measured at the same time as the display of the respective measurement display image. Along with the ambient brightness, the brightness signal is also influenced by the brightness of the measurement display image. Generally, the brightness sensed depends on the region of high luminous intensity. It is essential that the brightness signal is sensed at the point in time of the display of the measurement display image.

In step S3, the measured ambient brightness is also buffer-stored in a profile.

In step S4, it is checked whether a further measurement display image for the output of a sequence of measurement display images is provided. This further measurement display image may be output at a time close to the previous measurement display image. Alternatively, the further measurement display image may be part of a displayed video sequence.

If a further measurement display image is to be output (alternative: yes), a return is made to step S2 and the further measurement display image is output. Otherwise (alternative: no), the method is continued with step S5.

In step S5, the recorded profile of brightness signals, which specifies the strength/intensity of the brightness sensed by the ambient brightness sensor 12 during each displayed measurement image, is compared with a reference brightness profile. The reference brightness profile specifies successive brightness signals for the sequence of measurement display images when there is an unmasked display surface 3 of the display unit 2.

In order to make the measurement independent of the ambient brightness, only the differences between the brightness signals that have been recorded during the output of the individual measurement display images are compared with the corresponding differences of the brightness signals of the reference brightness profile. Preferably, for this purpose the brightness signals of three or more measurement display images are used.

The procedure is illustrated in FIGS. 3*a* and 3*b*. The cases of an unmasked display surface 3 and a masked display surface 3 are shown. The procedure involves outputting a sequence of measurement display images, which in each case have a pattern of a strip-like region with high luminous intensity alongside the remaining region of the display surface with low luminous intensity and represent the resultant brightness signal M for the case where a foreign object 7 is not present (FIG. 3*a*) and the case where there is a foreign object 7 (FIG. 3*b*) masking the display. It can be seen that, when a foreign object 7 is lying in a region of the display surface 3 on which the measurement display image outputs a high luminous intensity, a reduced magnitude of the brightness signal with respect to the reference signal is obtained. Forming the difference between the measured brightness signals allows this deviation to be reliably detected even when there are different ambient brightnesses.

In order to reduce the dependence on fluctuations of the ambient brightness, the sequence of the measurement images may be executed within a short time period, in particular within a time period of less than 1 s, in particular less than 100 ms.

In step S6, it is checked whether the differences between the brightness signals, i.e. the intensities of the brightness signals, indicate a deviation of the differences between the intensities with respect to the measurement display images with respect to the reference profile (without the presence of a foreign object). A deviation is obtained when there is a deviation of more than a threshold amount, in order to make allowance for measurement tolerances. If this is the case (alternative: yes), masking of the display surface, i.e. the presence of a foreign object 7 on the display surface 3, is detected and the method is continued with step S7, otherwise (alternative: no), the method is continued with step S1.

In step S7, the presence of a foreign object 7 on the display surface 3 is signaled. The signaling may take place with the aid of an optical or acoustic signal or in some other way that draws the attention of the vehicle occupants, in particular a driver, to the fact that the display is at least partially masked.

The measurements may be performed a number of times to increase the robustness, so that signaling of masking only takes place if the presence of a foreign object has been detected in a number of successive measuring operations.

Identifying that measurement display image in which a deviation from the reference profile has been detected allows the location of the masking to be likewise detected, since the masking must be over a region of high luminous intensity.

The measurement display images may have different patterns, which have different luminous intensities from region to region. Since different pixels act in different ways on the brightness signal sensed by the ambient brightness sensor 12, different patterns of the measurement display images bring about different brightness signals. The respective patterns of the measurement display images may comprise:

- one or more strip-like regions of high luminous intensity with otherwise a darkly displayed background;
- checkerboard regions of high luminous intensity with otherwise a darkly displayed background; or
- regions of different luminous intensity, in particular with otherwise a darkly displayed background.

The measurement display images of the sequence of measurement display images are preferably chosen such that each region of the display image over all the measurement display images of the sequence is provided at least once as a region of high luminous intensity. In this way, resting of a foreign object 7 on the display surface 3 can be detected at every location of the display surface 3, since a significantly lower brightness signal is measured when a measurement display image is displayed with a region of high luminous intensity that is covered by a foreign object 7.

LIST OF REFERENCE SIGNS

1 Reflection display system
2 Display unit
3 Display surface
4 Dashboard
5 Front windshield
6 Depression
7 Foreign object
10 Control unit
12 Ambient brightness sensor

What is claimed is:

1. A method for operating a reflection display system for displaying a display image for a vehicle occupant of a motor vehicle by reflection of the display image on a front windshield, wherein a display unit is configured to output the display image via a display surface of the display unit, the display unit being arranged on an upper side of a dashboard such that a reflection of the display image via the front windshield is perceptible in an eye region of a vehicle occupant, the method comprising:

- outputting a sequence of measurement display images with different patterns with different luminous intensities from region to region;
- obtaining a measured brightness profile by detecting, by an ambient brightness sensor, a respective brightness signal of each of the measurement display images, wherein the respective brightness signal is detected while a respective measurement display image of the sequence of measurement display images is being displayed, and wherein the measured brightness profile includes a sequence of the respective brightness signals over time;
- evaluating the measured brightness profile with respect to a predefined reference brightness profile of the sequence of measurement display images, wherein the reference brightness profile includes a sequence of reference brightness signals corresponding to times during which the display surface is unmasked and there is constant ambient brightness; and
- depending on a result of the evaluating, signaling a presence of a foreign object on the display surface.

2. The method according to claim 1, wherein:

each of the measurement display images has a pattern which has a first region of a first luminous intensity and a remaining region of a second luminous intensity, and the first luminous intensity is higher than the second luminous intensity.

3. The method according to claim 2, wherein the first regions of all the measurement display images cover an entire display region.

4. The method according to claim 2, wherein at least one pattern of the measurement display images comprises:

one or more strip-like regions of the first luminous intensity and remaining regions of the second luminous intensity;

checkerboard regions of the first luminous intensity and remaining regions of the second luminous intensity; or regions of different luminous intensities and remaining regions of the second luminous intensity, wherein the different luminous intensities are higher than the second luminous intensity.

5. The method according to claim 1, wherein the method is performed upon determining that an enabling condition is satisfied, wherein the enabling condition comprises at least one of:

an ambient brightness lies not above a first predefined threshold value, or a gradient of a variation of the ambient brightness lies below a second predetermined threshold value.

6. The method according to claim 1, wherein the sequence of measurement display images is run through within a time period of less than 1 s.

7. The method according to claim 6, wherein the time period is less than 100 ms.

8. The method according to claim 1, wherein the sequence of measurement display images is provided within a predefined video sequence, the measured brightness profile being recorded at corresponding output times of the measurement display images when outputting the video sequence.

9. The method according to claim 1, wherein the evaluating comprises:

obtaining a predefined change in the reference brightness signals of the reference brightness profile corresponding to two of the measurement display images; and comparing the predefined change with a corresponding change in the brightness signals of the measured brightness profile.

10. A reflection display system for displaying a display image for a vehicle occupant of a motor vehicle by reflection of the display image on a front windshield, the reflection display system comprising:

a display, which is configured to output the display image via a display surface of the display unit, the display being arranged on an upper side of a dashboard such that a reflection of the display image via the front windshield is perceptible in an eye region of a vehicle occupant;

an ambient brightness sensor, which is configured to detect an ambient brightness and to provide a corresponding brightness signal; and a control processor, which is configured to:

output a sequence of measurement display images with different patterns with different luminous intensities from region to region;

obtain a measured brightness profile by detecting, by the ambient brightness sensor, a respective brightness signal of each of the measurement display images, wherein the respective brightness signal is detected while a respective measurement display image of the sequence of measurement display images is being displayed, and wherein the measured brightness profile includes a sequence of the respective brightness signals over time;

evaluate the measured brightness profile with respect to a predefined reference brightness profile of the sequence of measurement display images, wherein the reference brightness profile includes a sequence of reference brightness signals corresponding to times during which the display surface is unmasked and there is constant ambient brightness; and depending on a result of an evaluation, signal a presence of a foreign object on the display surface.

11. The reflection display system according to claim 10, wherein:

the ambient brightness sensor is arranged such that an output of a region of a first luminous intensity by the display unit influences a measurement of a brightness signal, and the first luminous intensity is higher than a second luminous intensity of a remaining region.

12. The reflection display system according to claim 10, wherein the display unit is arranged in a depression such that the display image that is displayed on the display surface of the display unit is not directly perceptible in the eye region.

13. The reflection display system according to claim 12, wherein the ambient brightness sensor is arranged in the depression.

14. The reflection display system according to claim 13, wherein the ambient brightness sensor is arranged to a side of the display unit.

15. A motor vehicle comprising:

the dashboard between the front windshield of the motor vehicle and a steering column; and the reflection display system according to claim 10.

* * * * *